United States Patent [19]
Choi

[11] Patent Number: 5,872,818
[45] Date of Patent: Feb. 16, 1999

[54] APPARATUS FOR RECOVERING FULL DIGITAL SYMBOL TIMING

[75] Inventor: Yang-Seok Choi, Seoul, Rep. of Korea

[73] Assignee: Samsung Electronics Co., Ltd., Kyungki-Do, Rep. of Korea

[21] Appl. No.: 800,129

[22] Filed: Feb. 13, 1997

[30] Foreign Application Priority Data

Feb. 13, 1996 [KR] Rep. of Korea .......................... 96-3484

[51] Int. Cl.$^6$ ...................................................... H04L 7/00
[52] U.S. Cl. ............................ 375/355; 375/324; 375/327
[58] Field of Search ...................................... 375/355, 343, 375/207, 350, 376, 327, 326, 324, 344

[56] References Cited

U.S. PATENT DOCUMENTS

| | | | |
|---|---|---|---|
| 5,111,152 | 5/1992 | Makino .................................... | 375/324 |
| 5,193,103 | 3/1993 | Singh et al. ............................. | 375/327 |
| 5,309,482 | 5/1994 | Wright et al. ........................... | 375/343 |
| 5,724,396 | 3/1998 | Claydon et al. ......................... | 375/355 |

*Primary Examiner*—Stephen Chin
*Assistant Examiner*—Betsy L. Deppe
*Attorney, Agent, or Firm*—Sughrue, Mion, Zinn, Macpeak & Seas, PLLC

[57] ABSTRACT

A full digital symbol timing recovery apparatus which can recover a symbol timing from a received signal. In the apparatus, a fixed oscillator generates a frequency signal having a constant frequency. An analog-to-digital converter samples the received signal at the constant frequency supplied from the fixed oscillator and converts the analog signal into a digital signal. A matching matches and filters the digitized signal according to a load filter coefficient and adjusts a timing phase. A timing error detector detects a symbol timing error from the output of the matching filter. A subtracter subtracts a predetermined value from the output of the timing error detector and outputs the subtracted result. A numerically controlled oscillator generates a frequency signal which varies periodically according to the output of the subtracter. A read-only-memory in which a plurality of sets of the filter coefficients are prestored receives the output of the numerically controlled oscillator as an address value and loads a set of the filter coefficients corresponding to the address value into the matching filter. A controller generates a symbol clock using a sampling clock of the constant frequency output from the fixed oscillator and delays the symbol clock corresponding to the positions at which repeated data is generated according to the output of the numerically controlled oscillator and outputs the delayed result.

12 Claims, 4 Drawing Sheets

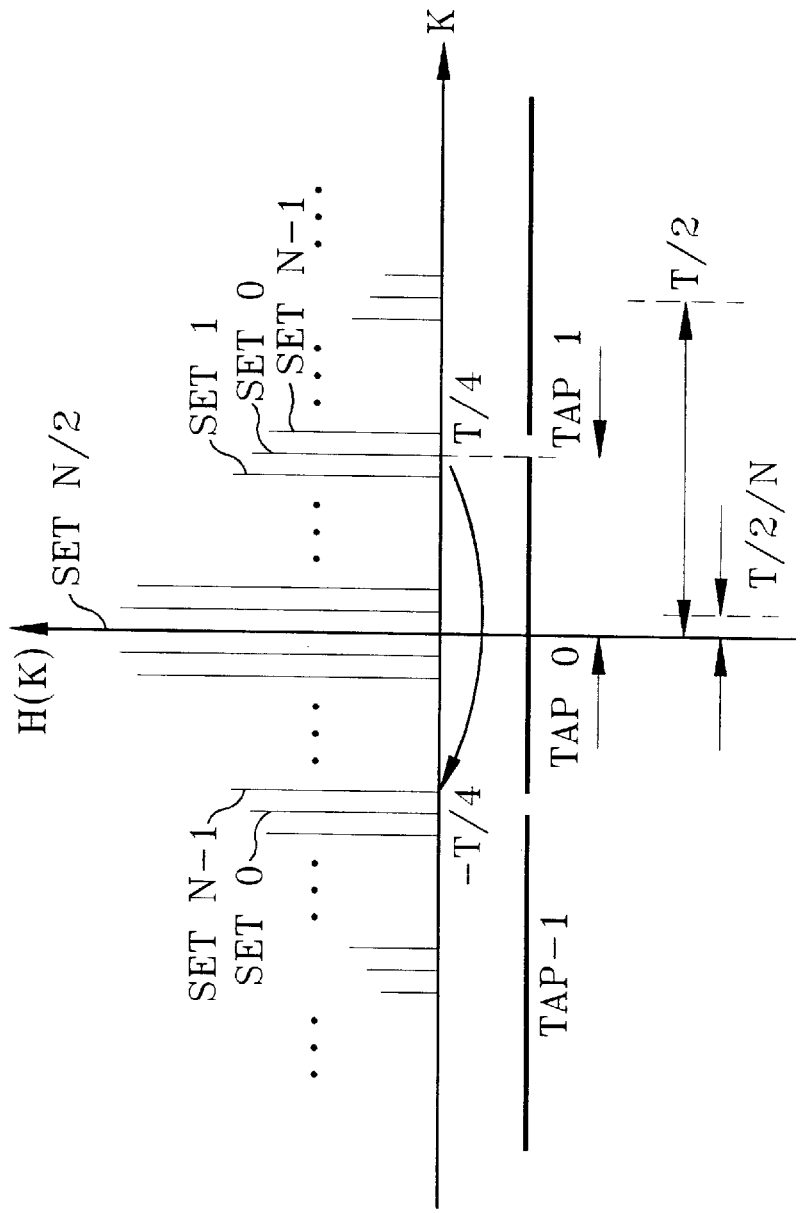

APPARATUS FOR RECOVERING FULL DIGITAL SYMBOL TIMING

BACKGROUND OF THE INVENTION

1. Field of the Invention

The present invention relates to an apparatus for recovering a symbol timing of a signal received in a receiver of a digital communication system. The present invention is based on Korean Application No. 96-3484, which is incorporated herein by reference.

2. Description of the Prior Art

A transmitter of a general digital communication apparatus modulates a signal by a quadrature amplitude modulation (QAM) method or a quadrature phase shift keying (QPSK) method and converts the modulated signal into an analog signal to transmit it. A receiver thereof demodulates the modulated signal transmitted from the transmitter and converts the demodulated signal into a digital signal to restore it to the original signal. Such a receiver can accurately restore the received signals into original symbol values when the received signals are sampled at the same interval of time and phase as those of the symbols transmitted from the transmitter. Therefore, one of the important signal processings which should be done in the receiver of the digital communication apparatus is to accurately restore a symbol timing representing a point in time to be sampled from the received signal. When a particular carrier corresponding to a sampling frequency is not transmitted, it is very important to accurately recover a symbol timing using only the received signal. A conventional apparatus for recovering a symbol timing is shown in FIG. 1.

In FIG. 1, a received signal is input to an analog-to-digital (A/D) converter 11. The A/D converter 11 samples the input signal at a frequency supplied from a voltage controlled oscillator (VCO) 15 and converts the analog signal into a digital signal. The digitized signal is output via a matching filter 12, and simultaneously input to a timing error detector 13. The timing error detector 13 detects a symbol timing error from the input signal and outputs a detected error value, to a loop filter 14. The loop filter 14 filters the input signal to remove various noises. The VCO 15 oscillates at a frequency according to the output of the loop filter 14 and supplies the oscillated frequency signal to the A/D converter 11.

Since analog components are used in the hardware implemented circuit, the apparatus of FIG. 1 is greatly affected by temperature and environment. Due to such effects, the apparatus does not appropriately trace an interval of time of symbols which are transmitted from the transmitter. As a result, a symbol timing drift phenomenon occurs in which the number of symbols transmitted from the transmitter differs from that of restored symbols.

To solve this problem, a full digital implementation of a symbol timing recovery apparatus, as shown in FIG. 2, was developed. In FIG. 2, a fixed oscillator 22 generates a constant frequency signal and supplies the same to an A/D converter 21. The A/D converter 21 converts the received signal into a digital signal using the frequency signal supplied from the fixed oscillator 22, and outputs the digitized signal to an interpolator 23. Meanwhile, a controller 27 receives a symbol timing error signal output a timing error detector 25 via a loop filter 26. The controller 27 generates an interpolation coefficient according to the input symbol timing error signal and supplies the same to the interpolator 23. The interpolator 23 interpolates the digitized signal with the interpolation coefficient supplied from the controller 27, and outputs the interpolated result to a matching filter 24.

The A/D converter 21 samples the received signal at a sampling frequency supplied from the fixed oscillator 22 and converts the analog signal to the digital signal. The digitized signal is output via the interpolator 23 and the matching filter 24 and simultaneously input to the timing error detector 25. The symbol timing error signal which is detected in the timing error detector 25 and has noise removed in the loop filter 26 is then input to the controller 27. The controller 27 generates the interpolation coefficient according to the input signal. The interpolator 23 interpolates the digitized signal according to the interpolation coefficient supplied from the controller 27, and thereby removes the symbol timing error. Although this apparatus can accurately recover the symbol timing, it is very complicated to implement using hardware.

SUMMARY OF THE INVENTION

To solve the above problem, it is an object of the present invention to provide a full digital symbol timing recovery apparatus for effectively recovering a symbol timing and enabling easy hardware implementation.

To accomplish the above object of the present invention, there is provided a full digital symbol timing recovery apparatus for recovering a symbol timing of a received signal. In the full digital symbol timing recovery apparatus, a fixed oscillator generates a frequency signal having a constant frequency. An analog-to-digital converter samples the received signal at the constant frequency supplied from the fixed oscillator and converts the analog signal into a digital signal. A matching filter matches and filters the digitized signal according to a filter coefficient and adjusts a timing phase. A timing error detector detects a symbol timing error from the output of the matching filter. A subtracter subtracts a predetermined value from the output of the timing error detector and outputs the subtracted result. A numerically controlled oscillator generates a frequency signal which varies periodically according to the output of the subtracter. A read-only-memory in which a plurality of sets of the filter coefficients are prestored receives the output of the numerically controlled oscillator as an address value and loads a set of the filter coefficients corresponding to the address value into the matching filter. A controller generates a symbol clock using a sampling clock of a constant frequency output from the fixed oscillator and delays the symbol clock corresponding to the positions at which repeated data is generated according to the output of the numerically controlled oscillator and outputs the delayed result.

BRIEF DESCRIPTION OF THE DRAWINGS

The preferred embodiments are described with reference to the drawings wherein:

FIG. 4 is a graphical view for explaining the filter coefficients of the matching filter shown in FIG. 3.

DETAILED DESCRIPTION OF THE PREFERRED EMBODIMENT

Figure 3:
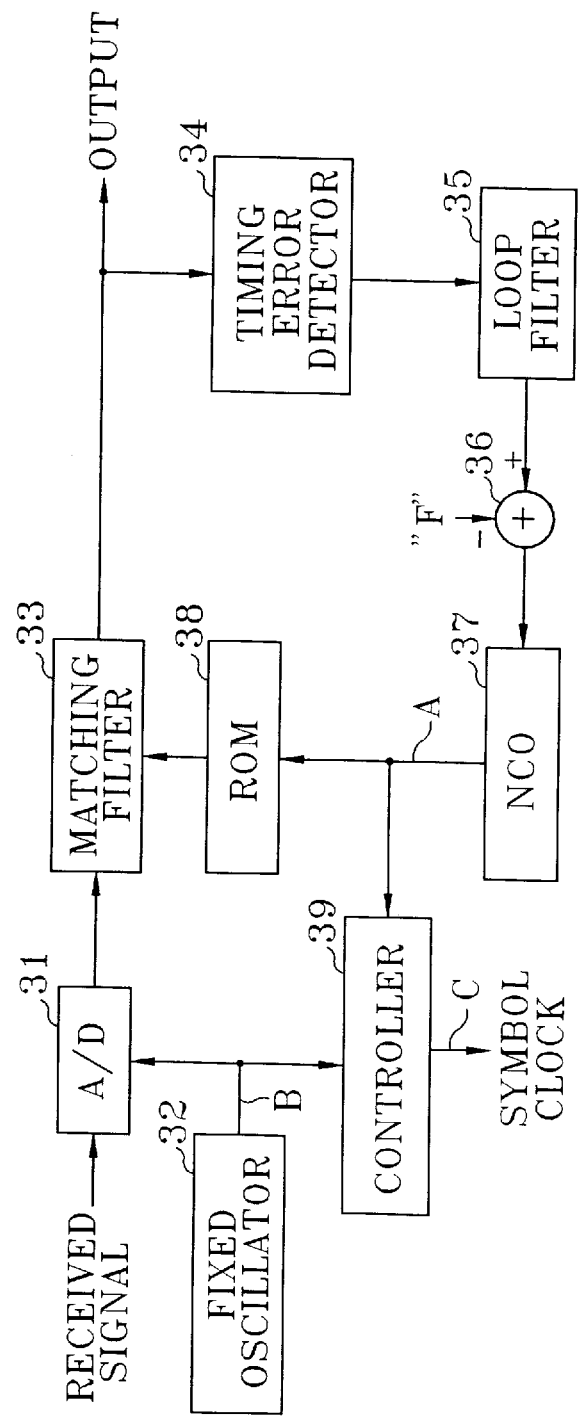
FIG. 3 is a block diagram showing a full digital symbol timing recovery apparatus according to a preferred embodiment of the present invention.

FIG. 3 shows a symbol timing recovery apparatus in which a subtracter 36 subtracts a predetermined value "F"

from the output of a loop filter 35, and outputs the subtracted result to a numerically controlled oscillator (NCO) 37. The NCO 37 oscillates at a frequency based on the output of the subtracter 36, and supplies the oscillated frequency to a ROM 38 as an address value. The ROM 38 stores filter coefficients of a matching filter 33. A filter coefficient corresponding to the address value output from the NCO 37 is supplied to the matching filter 33. Meanwhile, a controller 39 uses a sampling clock output from a fixed oscillator 32 to generate a symbol clock and delays the symbol clock by a predetermined time based on the output value of the NCO 37, and outputs the delayed result.

The operation of the apparatus shown in FIG. 3 will now be described in more detail with reference to FIGS. 4 through 5C.

Figure 1:
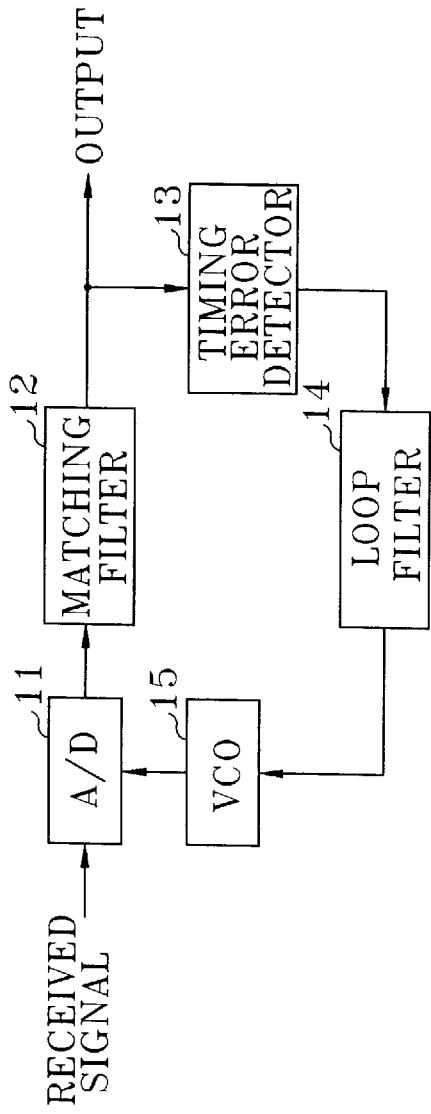
FIG. 1 is a block diagram showing a conventional symbol timing recovery apparatus.
Figure 2:
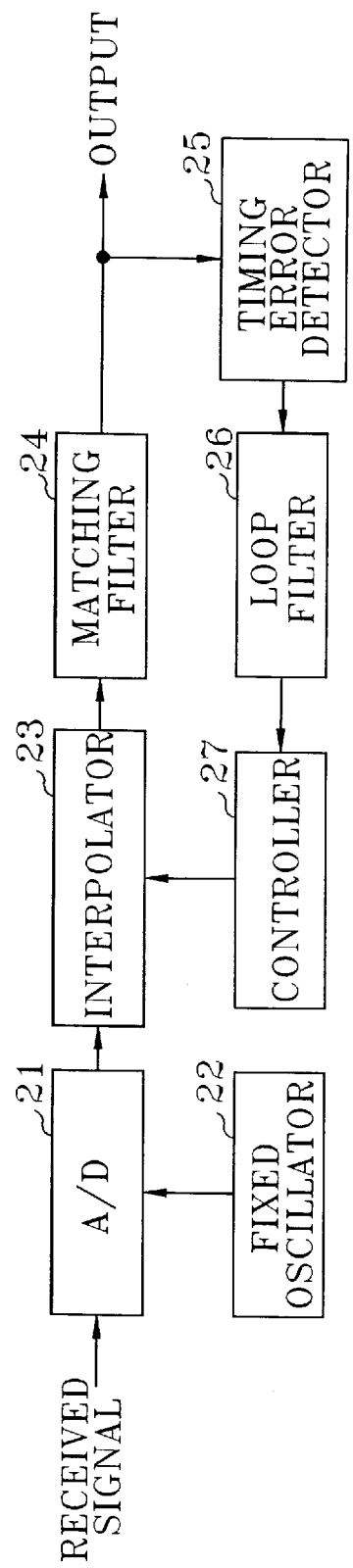
FIG. 2 is a block diagram showing a conventional full digital symbol timing recovery apparatus.

First, an A/D converter 31 samples a received signal with a sampling frequency supplied from the fixed oscillator 32. Here, when the sampling frequency of the fixed oscillator 32 is twice that of a symbol frequency of a transmitted symbol, the A/D converter 31 samples the received signal with two samples per one symbol. The sample signal is input to the matching filter 33. The matching filter 33 matches and filters the sampled signal according to a filter coefficient loaded from the ROM 38. Here, the matching filter 33 includes a function possessed by the interpolator 23 of FIG. 2.

The following Table 1 represents coefficient values according to each set and tap position when a raised cosine or square root raised cosine value h(k), which is chiefly used as a filter coefficient of the matching filter 33, is oversampled 2n times, that is, h(k) wherein $1-n/2-nm \leq k \leq n/2+nm$. Here, it is assumed that the tap has $2m+1$ possible values. The coefficient h(k) at the i-th set in which $0 \leq i \leq n-1$ and the j-th tap in which $-m \leq j \leq m$ is $h(n/2-i+nj)$.

transmitter, data is periodically lost. On the contrary, when the sampling frequency of the receiver is higher than that of the transmitter, data is periodically repeated. If the position of the data repetition is found, the repeated data can be easily removed. However, when data is lost, the lost data cannot be recovered. Therefore, the sampling frequency of the receiver should always be set higher than that of the transmitter.

For example, assuming that a symbol rate (R=1/T) is 30 M/sec, twice oversampling is performed, a tolerance of an oscillator at the transmitter end is 10 ppm, and a tolerance of an oscillator at the receiver end is 25 ppm, the maximum oscillation frequency of the transmitter oscillator is (60+60× 0.000010)MHz and the minimum oscillation frequency of the receiver oscillator is (x−x×0.000025)MHz. Here, x is a frequency of the receiver oscillator and can be calculated from a condition that the minimum oscillation frequency of the receiver oscillator is always greater than the maximum oscillation frequency of the transmitter oscillator, as follows.

x×0.999975>60×1.000010

Thus, x>60×1.000010/0.999975 MHz=60.002100 MHz.

That is, if an oscillator having a minimum oscillation frequency value greater than 60.002100 MHz is installed at the receiver end, the oscillation frequency of the receiver is always greater than that of the transmitter, thereby preventing data loss.

However, since the sampling frequency of the receiver is higher than that of the transmitter, the digitized signal using such a sampling frequency leads in time compared with that in the transmitter. A timing error detector 34 detects a symbol timing error using the digital signal output from the matching filter 33. The detected timing error value is passed through the loop filter 35, during which noise is removed, and then the noise-removed timing error value is input to the

TABLE 1

| Tap j | C(−m) | C(−m + 1) | ... | C(−1) | C(0) | C(1) | ... | C(m − 1) | C(m) |
|---|---|---|---|---|---|---|---|---|---|
| Set i | | | | | | | | | |
| n − 1 | h(1 − n/2 − nm) | h(n/2 − nm + 1) | ... | ... | h(−n/2 + 1) | | ... | ... | h(1 − n/2 + n/m) |
| n − 2 | h(2 − n/2 − nm) | h(n/2 − nm + 2) | ... | ... | ... | | ... | ... | ... |
| ... | ... | ... | ... | ... | ... | ... | ... | ... | ... |
| ... | ... | ... | ... | ... | ... | ... | ... | ... | ... |
| n/2 + 1 | ... | ... | ... | h(−1 − n) | h(−1) | h(n − 1) | ... | ... | ... |
| n/2 | ... | ... | ... | h(−n) | h(0) | h(n) | ... | ... | ... |
| n/2 − 1 | ... | ... | ... | h(−n + 1) | h(1) | h(n + 1) | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| 1 | ... | ... | ... | ... | h(n/2 − 1) | ... | ... | ... | ... |
| 0 | h(n/2 − nm) | h(3 n/2 − nm) | ... | h(−n/2) | h(n/2) | h(3 n/2) | ... | ... | h(n/2 + nm) |

The n sets of coefficient values represented in Table 1 are stored in the ROM 38. One set is selected according to the output of the NCO 37 and the selected set is loaded into the matching filter 33. That is, the output of the NCO 37 is used as an address of the ROM 38 in which n is always an even number. Referring to FIG. 4 showing the filter coefficients, the n sets have a difference of (T/2)/n seconds, respectively, and the resolution is 360°/2n. In the ideal case, when the frequency and phase of a sampling frequency signal generated in a receiver are the same as those generated in a transmitter, an identical set will always be loaded into the matching filter 33. However, a general oscillator does not always oscillate at a constant frequency, but oscillates at a frequency within a predetermined range. Here, when the sampling frequency of the receiver is lower than that of the subtracter 36. The subtracter 36 subtracts a predetermined value "F" from the input value and outputs the subtracted result to the NCO 37. Here, the purpose of the predetermined value "F" is to periodically change the oscillation frequency of the NCO 37. "F" is determined according to whether the gain and sampling frequency of the NCO 37 is higher than the symbol frequency. The NCO 37 oscillates at a frequency according to the output of the subtracter 36, and the oscillating frequency is supplied to the ROM 38 as the address value. First, the coefficients of a set n/2 are selected from the ROM 38 according to an initial address value output from the NCO 37, and the selected coefficients are loaded into the matching filter 33. Thereafter, the coefficients of the set n/2−1, the set n/2−2, etc. which are delayed by T/(2n) according to the periodically varying output of the NCO 37, are sequentially selected in turn.

When the filter coefficients are loaded into the matching filter 33 as described above, the coefficients of the set 0 are loaded, and then the coefficients delayed by T/(2n) are loaded in sequence. The coefficients of the set 0 are the most delayed coefficients among the n sets. As shown by the arrows in FIG. 4, a next sequence to be loaded proceeds according to the coefficients of the set n−1. The coefficients of the set n−1 are those delayed by −T/4+T/(2n) and precedes in phase by (T/2) from the set 0 which has been previously loaded. Thus, the symbol is repeated at that instant.

Figures 5A, 5B, 5C:
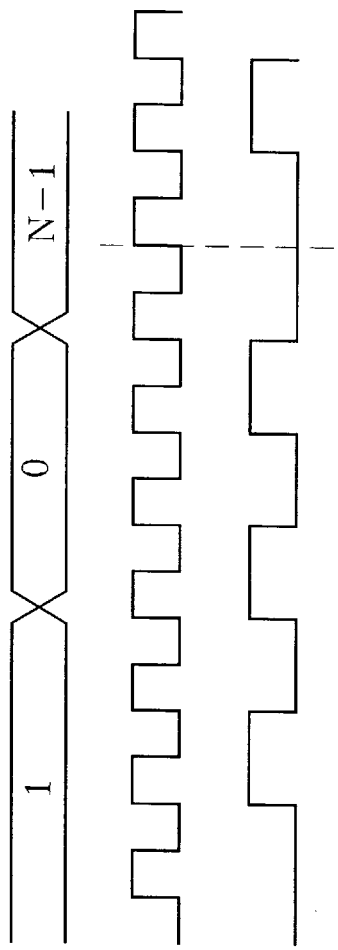
FIGS. 5A through 5C are timing diagrams related to the operation of the controller shown in FIG. 3.

Referring to FIGS. 5A–5C showing generation of the symbol clock from the sampling frequency, the controller 39 generates the symbol clock of FIG. 5C whose level is inverted at the rising edge of the sampling clock of FIG. 5B which is output from the fixed oscillator 32. If the output value of the NCO 37 passes "0" as shown in FIG. 5A during the time when the symbol clock is generated, the symbol clock is delayed by T/2 (=180°), as shown by the dotted line. Then, the symbol corresponding to the previous position in which the symbol clock has not yet been delayed can be removed. Such an operation of the controller 39 can be easily implemented using a logic circuit.

As described above, the symbol timing recovery apparatus according to the present invention can be easily embodied in hardware, and the symbol timing can be efficiently recovered from the received signal.

While only certain embodiments of the invention have been specifically described herein, it will be apparent that numerous modifications may be made thereto without departing from the spirit and scope of the invention.

What is claimed is:

1. A full digital symbol timing recovery apparatus for recovering a symbol timing of a received analog signal, comprising:

a fixed oscillator for generating a frequency signal having a constant frequency;

an analog-to-digital converter for sampling the received analog signal at the constant frequency supplied from said fixed oscillator and converting the received analog signal into a digital signal;

a matching filter for matching and filtering the digitized signal according to a set of filter coefficients, and for adjusting a timing phase;

a timing error detector for detecting a symbol timing error from the output of said matching filter;

a subtracter for subtracting a predetermined value from the output of said timing error detector and outputting the subtracted result;

a numerically controlled oscillator for generating a frequency signal which varies periodically according to the output of said subtracter;

a read-only-memory, in which a plurality of sets of filter coefficients are prestored, for receiving the output of said numerically controlled oscillator as an address value and loading the set of filter coefficients, of the plurality of sets of filter coefficients, corresponding to the address value into said matching filter; and a controller for generating a symbol clock using a sampling clock of the constant frequency output from said fixed oscillator, for delaying the symbol clock corresponding to the positions at which repeated data is generated whereby delaying is based on the output of said-numerically controlled oscillator, and for outputting the delayed result.

2. The full digital symbol timing recovery apparatus according to claim 1, wherein the constant frequency of the frequency signal generated in said fixed oscillator is higher than a symbol frequency of the received signal.

3. The full digital symbol timing recovery apparatus according to claim 1, wherein said predetermined value is used for periodically changing the oscillating frequency of said numerically controlled oscillator.

4. The full digital symbol timing recovery apparatus according to claim 1, wherein each set of said plurality of sets of filter coefficients has a phase difference of (T/2)/n seconds in which T is a symbol timing period, and n is the number of sets.

5. The full digital symbol timing recovery apparatus according to claim 4, wherein said controller delays said symbol clock by T/2 and outputs the delayed result when loading filter coefficients following the loaded filter coefficients of the most delayed set among said plurality of sets of filter coefficients.

6. The full digital symbol timing recovery apparatus according to claim 1, further comprising a loop filter for removing noise from the output of said timing error detector and inputting the noise-removed output of said timing error detector to the subtracter.

7. A method of recovering a symbol timing of an analog signal received by a full digital symbol timing recovery apparatus, comprising the steps of:

prestoring a plurality of sets of filter coefficients;

sampling the received signal at a constant frequency and converting the received analog signal into a digital signal;

filtering the digitized signal according to a selected set of filter coefficients of said plurality of sets of filter coefficients, and adjusting a timing phase;

detecting a symbol timing error from the filtered signal;

subtracting a predetermined value from the symbol timing error;

generating a frequency signal which varies periodically according to the subtracted result, wherein said selected set of filter coefficients corresponds to this frequency signal; and generating a symbol clock using a sampling clock of the constant frequency, delaying the symbol clock corresponding to the positions at which repeated data is generated, and outputting the delayed result.

8. The method according to claim 7, wherein the constant frequency is higher than a symbol frequency of the received signal.

9. The method according to claim 7, wherein said predetermined value is used to periodically change the frequency of the generated frequency signal.

10. The method according to claim 7, wherein each set of said plurality of sets of filter coefficients has a phase difference of (T/2)/n seconds in which T is a symbol timing period, and n is the number of sets.

11. The method according to claim 10, further comprising the steps of delaying said symbol clock by T/2 and outputting the delayed result when selecting filter coefficients following the selection of the most delayed set of filter coefficients among said plurality of sets of filter coefficients.

12. The method according to claim 7, further comprising the step of removing noise from the symbol timing error before subtracting the predetermined value from the symbol timing error.

* * * * *